(12) United States Patent
Xu et al.

(10) Patent No.: US 9,181,447 B2
(45) Date of Patent: Nov. 10, 2015

(54) METAL PROTECTION COATING, HOT-DIP ZN METALLIC MATERIAL AND HOT-DIP AL—ZN METALLIC MATERIAL USING THE SAME

(75) Inventors: Zhefeng Xu, Panzhihua (CN); Dongsheng Mei, Panzhihua (CN); Yong Chen, Panzhihua (CN); Quan Xu, Panzhihua (CN); Yan Lou, Panzhihua (CN); Yilin Zhou, Panzhihua (CN)

(73) Assignee: PANGANG GROUP PANZHIHUA IRON & STEEL RESEARCH INSTITUTE CO., LTD., Sichuan Province (CN)

( * ) Notice: Subject to any disclaimer, the term of this patent is extended or adjusted under 35 U.S.C. 154(b) by 503 days.

(21) Appl. No.: 13/619,002

(22) Filed: Sep. 14, 2012

(65) Prior Publication Data

US 2013/0078456 A1 Mar. 28, 2013

(30) Foreign Application Priority Data

Sep. 28, 2011 (CN) .......................... 2011 1 0301944

(51) Int. Cl.
| | |
|---|---|
| C09D 101/28 | (2006.01) |
| C09D 127/12 | (2006.01) |
| C09D 167/00 | (2006.01) |
| C23C 2/06 | (2006.01) |
| C23C 2/12 | (2006.01) |
| C23C 2/26 | (2006.01) |
| C23C 2/28 | (2006.01) |
| C23C 26/00 | (2006.01) |
| C09D 5/08 | (2006.01) |
| C09D 5/16 | (2006.01) |
| C09D 7/12 | (2006.01) |
| B05D 5/00 | (2006.01) |

(52) U.S. Cl.
CPC .............. *C09D 101/28* (2013.01); *C09D 5/084* (2013.01); *C09D 5/1618* (2013.01); *C09D 5/1675* (2013.01); *C09D 7/125* (2013.01); *C09D 7/1216* (2013.01); *C09D 7/1266* (2013.01); *C09D 101/284* (2013.01); *C09D 101/286* (2013.01); *C09D 127/12* (2013.01); *C09D 167/00* (2013.01); *C23C 2/06* (2013.01); *C23C 2/12* (2013.01); *C23C 2/26* (2013.01); *C23C 2/28* (2013.01); *C23C 26/00* (2013.01); *B05D 5/00* (2013.01); *B05D 2202/10* (2013.01); *B05D 2350/65* (2013.01); *Y10T 428/265* (2015.01)

(58) Field of Classification Search
None
See application file for complete search history.

(56) References Cited

U.S. PATENT DOCUMENTS

| | | | | |
|---|---|---|---|---|
| 2004/0077768 | A1* | 4/2004 | Greenwood | 524/492 |
| 2004/0206266 | A1* | 10/2004 | Maze et al. | 106/1.17 |
| 2010/0119850 | A1* | 5/2010 | Browne et al. | 428/447 |
| 2012/0135267 | A1 | 5/2012 | Yuan et al. | |

FOREIGN PATENT DOCUMENTS

| | | | | |
|---|---|---|---|---|
| CN | 200810125728 | | 6/2008 | |
| JP | 56034774 A | * | 4/1981 | C09J 3/00 |
| WO | 2010/133068 | | 11/2010 | |

OTHER PUBLICATIONS

English Abstract of JP 56034774 A from JPO&Japio (1981).*
English Abstract of JP 56034774 A from Derwent (1981).*

* cited by examiner

*Primary Examiner* — Kenneth Stachel
(74) *Attorney, Agent, or Firm* — Volpe and Koenig, P.C.

(57) ABSTRACT

A metal protective coating is provided, which is obtained by mixing homogeneously a raw mixture, which contains water soluble silicate, promoter, silane coupling agent, silicon oxide packing, water soluble film formation resin, and water; wherein, the promoter is at least one selected from the group consisting of methyl cellulose, carboxymethyl cellulose, carboxyethyl cellulose, carboxymethyl-hydroxyethyl cellulose, and their soluble salts; the silane coupling agent contains a first silane derivative shown in formula (1), wherein, $R_1$, $R_2$, and $R_3$ are methoxyl or ethyoxyl respectively, and n is an integer with the range of 1-4. A hot-dip Zn metallic material and a hot-dip Al—Zn alloy metallic material are further provided. The protective film formed by the metal protective coating as provided has outstanding corrosion resistance, water resistance, thermal resistance, and fingerprint resistance properties.

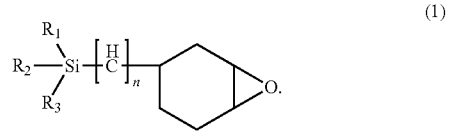

(1)

16 Claims, No Drawings

METAL PROTECTION COATING, HOT-DIP ZN METALLIC MATERIAL AND HOT-DIP AL—ZN METALLIC MATERIAL USING THE SAME

CROSS REFERENCE TO RELATED APPLICATIONS

This application claims priority to Chinese Application No. 201110301944.9, filed on Sep. 28, 2011, entitled "Metal Protective Coating, Hot-Dip Zn Metallic Material and Hot-Dip Al—Zn Metallic Material", which is specifically and entirely incorporated by reference.

TECHNICAL FIELD

The present invention relates to metal protection domain, in particular to a metal protective coating, a hot-dip Zn metallic material, and a hot-dip Al—Zn metallic material.

BACKGROUND

Hot-dip metallic materials, including hot-dip Zn metallic materials and hot-dip Al—Zn metallic materials, are coated with a layer of metal protective coating on the surface to form a protective film, so as to prevent corrosion. Therefore, the properties of the metal protective coating are very important for corrosion protection of hot-dip metallic materials.

For example, the Chinese Patent Application No. CN101608306A discloses a passivating liquid, which also belongs to a metal protective coating, wherein, the passivating agent is a water solution that contains water soluble molybdenum compound, boric acid, water soluble organic substance, and silicasol, and the water soluble organic substance is a mixture of alcohol and organic carboxylic acid.

However, experiments have shown that the corrosion resistance, water resistance, thermal resistance, and fingerprint resistance of the protective film formed by the metal protective coating are still not good enough.

SUMMARY OF THE INVENTION

The object of the present invention is to overcome the drawbacks of protective films formed by existing metal protective coating materials in corrosion resistance, water resistance, thermal resistance, and fingerprint resistance, and provides a metal protective coating that can form a protective film with high corrosion resistance, high water resistance, high thermal resistance, and high fingerprint resistance properties.

To attain the above-mentioned object, the present invention provides a metal protective coating, which is obtained by mixing homogeneously a raw mixture, which contains water soluble silicate, promoter, silane coupling agent, silicon oxide packing, water soluble film formation resin, and water; the promoter is at least one selected from the group consisting of methyl cellulose, carboxymethyl cellulose, carboxyethyl cellulose, carboxymethyl-hydroxyethyl cellulose, and their soluble salts; the silane coupling agent contains a first silane derivative shown in formula (I), where, $R_1$, $R_2$, and $R_3$ are methoxyl or ethyoxyl, and n is an integer within the range of 1-4;

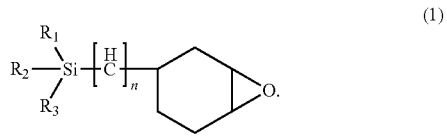

The present invention further provides a hot-dip Zn metallic material, which comprises a hot-dip Zn metallic substrate and a coating layer attached to the hot-dip Zn metallic substrate, wherein, the coating layer is the cured product of the above-mentioned metal protective coating.

The present invention further provides a hot-dip Al—Zn metallic material, which comprises a hot-dip AL-Zn metallic substrate and a coating layer attached to the hot-dip AL-Zn metallic substrate, wherein, the coating layer is the cured product of the above-mentioned metal protective coating.

With the above technical scheme, the protective film formed by the metal protective coating provided in the present invention has outstanding corrosion resistance, water resistance, thermal resistance, and fingerprint resistance properties.

Other characteristics and advantages of the present invention will be further detailed in the embodiments hereunder.

DETAILED DESCRIPTION OF THE EMBODIMENTS

Hereunder the embodiments of the present invention will be detailed. It should be appreciated that the embodiments described here are only provided to describe and explain the present invention, but shall not be deemed as constituting any limitation to the present invention.

The metal protective coating provided in the present invention is obtained by mixing homogeneously a raw mixture, which contains water soluble silicate, promoter, silane coupling agent, silicon oxide packing, water soluble film formation resin, and water; the promoter is at least one selected from the group consisting of methyl cellulose, carboxymethyl cellulose, carboxyethyl cellulose, carboxymethyl-hydroxyethyl cellulose, and their soluble salts; the silane coupling agent contains a first silane derivative shown in formula (1), where, $R_1$, $R_2$, and $R_3$ are methoxyl or ethyoxyl, and n is an integer within the range of 1-4;

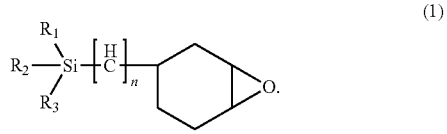

Wherein, the metal protective coating is obtained by mixing the raw mixture homogeneously, and is stable and homogeneous liquid. Preferably, the components of the raw mixture are mixed homogeneously within 1-180 days before the metal protective coating is applied. Wherein, there is no special requirement for the mixing order of the components, which is to say, the components of the raw mixture can be mixed directly at the same time, in batches, or in steps, as long as a homogeneous and stable phase is obtained; preferably, the mixture is agitated while the components are mixed, to make the mixture more homogeneous.

In the metal protective coating provided in the present invention, on the basis of 1 part by weight (pbw) water soluble silicate, the dosage of the promoter can be 0.2-1.8 pbw, preferably 0.5-0.7 pbw.

Wherein, relative to 1 pbw water soluble silicate, the dosage of the silane coupling agent can be 0.5-4.5 pbw, preferably 1.4-1.8 pbw.

Wherein, relative to 1 pbw water soluble silicate, the dosage of the silicon oxide packing can be 0.25-2.2 pbw, preferably 0.6-0.85 pbw.

Wherein, relative to 1 pbw water soluble silicate, calculated in solid substance, the dosage of the water soluble film formation resin can be 0.8-6.8 pbw, preferably 2.1-2.7 pbw.

Wherein, relative to 1 pbw water soluble silicate, the dosage of water can be 10-100 pbw, preferably 25-40 pbw.

In the metal protective coating provided in the present invention, the water soluble silicate can be sodium silicate and/or potassium silicate.

In the metal protective coating provided in the present invention, the promoter is at least one selected from the group consisting of methyl cellulose, carboxymethyl cellulose, carboxyethyl cellulose, carboxymethyl-hydroxyethyl cellulose, and their soluble salts, wherein, their soluble salts can be sodium salt and/or potassium salt, such as sodium carboxymethyl cellulose, potassium carboxymethyl cellulose, sodium carboxyethyl cellulose, potassium carboxyethyl cellulose, sodium carboxymethyl-hydroxyethyl cellulose, and potassium carboxymethyl-hydroxyethyl cellulose; to further improve the performance of the metal protective coating, preferably, the promoter is methyl cellulose.

In the metal protective coating provided in the present invention, wherein, in the first silane derivative shown in formula (1), at least one of $R_1$, $R_2$, and $R_3$ is methoxyl, or at least two of $R_1$, $R_2$, and $R_3$ are methoxyl, or all of $R_1$, $R_2$, and $R_3$ are methoxyl; n can be 1, 2, 3, or 4; to further improve the performance of the metal protective coating, preferably, in the first silane derivative shown in formula (1), all of $R_1$, $R_2$, and $R_3$ are methoxyl, and n is 2. Which is to say, the first silane derivative shown in formula (1) is 2-(3,4-epoxy-cyclohexyl)-ethyl-trimethoxy silane.

In the metal protective coating provided in the present invention, wherein, to further improve the performance of the metal protective coating, preferably the silane coupling agent further comprises a second silane derivative, which is at least one selected from the group consisting of γ-aminopropyl-triethoxy silane, γ-glycidol ether propoxy-trimethoxy silane, γ-methacryl-oxy-propyl-trimethoxy silane, and N-2-amino-ethyl-3-aminopropyl-trimethoxy silane.

In the metal protective coating provided in the present invention, wherein, to further improve the performance of the metal protective coating, preferably the weight ratio of the first silane derivative to the second silane derivative is 1:0.1-0.4, more preferably 1:0.2-0.3.

In the metal protective coating provided in the present invention, wherein, there is no special requirement for the silicon oxide packing, which is to say, the silicon oxide packing can be any silicon oxide-based packing material, for example, the silicon oxide packing can be nanometer silicon dioxide powder and/or silicasol; preferably, the silicon oxide packing is nanometer silicon dioxide powder, with 10-90 nm particle size.

In the metal protective coating provided in the present invention, the water soluble film formation resin can be any water-soluble modified or unmodified resin that can form a film; there is no special requirement for the water-soluble film formation resin in the present invention; for example, the water-soluble film formation resin can be at least one selected from the group consisting of water-soluble polyester film formation resin (e.g., polyester resin CB2200 from Guangzhou LAPO Fine Chemical Co., Ltd.), water-soluble styrene-acrylic film formation resin (e.g., styrene-acrylic emulsion xy-108b from Guangzhou Chaolong Chemical Technology Co., Ltd.), water-soluble epoxy film formation resin (e.g., epoxy resin BH620 from Dongguan Heima Chemical Co., Ltd.), water-soluble polyurethane film formation resin (e.g., polyurethane resin 812 from Fujian Jinjiang Jianhua Co., Ltd.), water-soluble silicone-acrylic film formation resin (e.g., silicone-acrylic emulsion TC-05 from Qingdao Xingguo Paint Co., Ltd., with 48 wt. % solid content), water-soluble acrylic film formation resin (e.g., acrylic resin A-3418 from Guangzhou Oupeng Chemical Co., Ltd.), and water-soluble fluorocarbon film formation resin (e.g., aqueous fluorocarbon emulsion SKFT-I from Beijing Sokang Nano Technology Co., Ltd.); preferably, the water soluble film formation resin is at least one selected from the group consisting of water soluble styrene-acrylic film formation resin, water soluble epoxy film formation resin, water-solubility silicone-acrylic film formation resin, water soluble acrylic film formation resin, water soluble polyurethane film formation resin, and water soluble polyester film formation resin.

Besides the components described above, the metal protective coating provided in the present invention can also contain other components that don't have adverse effect to the properties of the metal protective coating, such as one or more of dye, pigment, dispersing agent, and anti-foaming agent. On the basis of the total weight of the metal protective coating, the total content of other components doesn't exceed 20 wt. %, preferably doesn't exceed 10 wt. %. The anti-foaming agent can be any anti-foaming agent well-known in the art, such as one or more of polyether anti-foaming agent, high alcohol, silicon anti-foaming agent, and polyether modified silicone anti-foaming agent, etc. More specifically, the anti-foaming agent can be one or more of the SD-401 series anti-foaming agents purchased from Dongying Shidachuangxin Science & Technology Co. Ltd. Preferably, on the basis of the total weight of the metal protective coating, the content of the anti-foaming agent is 0.01-0.05 wt. %.

The hot-dip Zn metallic material provided in the present invention comprises a hot-dip Zn metallic substrate and a coating layer attached to the hot-dip Zn metallic substrate, wherein, the coating layer is the cured product of the above-mentioned metal protective coating.

Wherein, the hot-dip Zn metallic substrate is a metallic substrate which has zinc plating, and in the zinc plating the zinc content can be 92.5-95.5 wt. %. The zinc plating can also contain other components conventionally used in the zinc plating, such as silicon.

In the hot-dip Zn metallic material provided in the present invention, the thickness of the coating layer can be normal thickness of corrosion-resistant coating layer of hot-dip Zn metallic material; to improve the performance of the coating layer, preferably the thickness of the coating layer is 0.05-2 μm, more preferably 0.1-1 μm.

In the hot-dip Zn metallic material provided in the present invention, the method for attaching the coating layer to the hot-dip Zn metallic substrate can comprise: applying the metal protective coating to the surface of the hot-dip Zn metallic substrate, and then drying, wherein, the drying temperature can be 60-120° C., preferably 90-110° C., and the drying duration can be 0.5-3 s. The dosage of the metal protective coating can be determined according to the thickness of the coating layer.

The hot-dip Al—Zn metallic material provided in the present invention comprises a hot dip Al—Zn metallic substrate and a coating layer attached to the hot-dip Al—Zn metallic substrate, wherein, the coating layer is the cured product of the above-mentioned metal protective coating.

Wherein, the hot-dip Al—Zn metallic substrate is a metallic substrate which has Al—Zn plating, and in Al—Zn plating the Zn content can be 41.5-43.5 wt. % and the Al content can be 51.5-55.0 wt. %. The Al—Zn plating can also contain other components conventionally used in the Al—Zn plating, such as silicon.

In the hot-dip Al—Zn metallic material provided in the present invention, the thickness of the coating layer can be normal thickness of corrosion-resistant coating layer of hot-dip Al—Zn metallic material; to improve the performance of the coat, preferably the thickness of the coating layer is 0.05-2 μm, more preferably 0.1-1 μm.

In the hot-dip Al—Zn metallic material provided in the present invention, the method for attaching the coat to the hot-dip Al—Zn metallic substrate can comprise: applying the metal protective coating to the surface of the hot-dip Al—Zn metallic substrate, and then drying, wherein, the drying temperature can be 60-120, preferably 90-110° C., and the drying duration can be 0.5-3 s. The dosage of the metal protective coating can be determined according to the thickness of the coating layer.

Wherein, the drying method can be selected from one or more of hot air drying, induction heating, and infrared radiation heating.

In the present invention, unless otherwise specified, the volume of any liquid or solid refers to the volume at 20° C. under standard atmospheric pressure.

Hereunder the present invention will be further detailed in Examples.

EXAMPLE 1

Mix 1 pbw water soluble silicate ($Na_2SiO_3$), 0.6 pbw promoter (methyl cellulose), 1.6 pbw silane coupling agent (mixed from the first silane derivative (2-(3,4-epoxy-cyclohexyl)-ethyl-trimethoxy silane, purchased from Hubei Debang Fine Chemical Co., Ltd.) and the second silane derivative (γ-aminopropyl-triethoxysilane, purchased from Hubei Debang Fine Chemical Co., Ltd.) at 1:0.25 weight ratio), 0.72 pbw silicon oxide packing (nanometer silicon dioxide powder, purchased from GE (USA), RNS-E, with 20 nm average particle size), 2.4 pbw (calculated in solid substance) water soluble film formation resin (water soluble silicone-acrylic film formation resin (silicone-acrylic emulsion TC-05 purchased from Qingdao Xingguo Paint Co., Ltd., with 48 wt. % solid content), and 28 pbw water to homogeneous state, with agitation at 1,500 rpm agitation speed, to obtain the metal protective coating in this Example.

EXAMPLE 2

Mix 1 pbw water soluble silicate ($K_2SiO_3$), 0.5 pbw promoter (methyl cellulose), 1.4 pbw silane coupling agent (mixed from the first silane derivative (2-(3,4-epoxy-cyclohexyl)-ethyl-triethoxy silane, purchased from Hubei Debang Fine Chemical Co., Ltd.) and the second silane derivative (γ-glycidol ether propoxy-trimethoxy silane, purchased from Hubei Debang Fine Chemical Co., Ltd.) at 1:0.4 weight ratio), 0.6 pbw silicon oxide packing (nanometer silicon dioxide powder, purchased from GE (USA), RNS-E, with 20 nm average particle size), 2.1 pbw (calculated in solid substance) water soluble film formation resin (water soluble acrylic film formation resin (acrylic resin A-3418 purchased from Guangzhou Oupeng Chemical Co., Ltd.), and 25 pbw water to homogeneous state, with agitation at 1,500 rpm agitation speed, to obtain the metal protective coating in this Example.

EXAMPLE 3

Mix 1 pbw water soluble silicate ($Na_2SiO_3$), 0.7 pbw promoter (carboxyethyl cellulose), 1.8 pbw silane coupling agent (mixed from the first silane derivative (2-(3,4-epoxy-cyclohexyl)-propyl-trimethoxy silane, purchased from Hubei Debang Fine Chemical Co., Ltd.) and the second silane derivative (γ-glycidol ether propoxy-trimethoxy silane, purchased from Hubei Debang Fine Chemical Co., Ltd.) at 1:0.1 weight ratio), 0.85 pbw silicon oxide packing (30 wt. % silicasol, calculated in solid substance), 2.7 pbw (calculated in solid substance) water soluble film formation resin (water soluble polyurethane film formation resin (polyurethane resin 812 purchased from Fujian Jinjiang Jianhua Co., Ltd.), and 40 pbw water to homogeneous state, with agitation at 1,500 rpm agitation speed, to obtain the metal protective coating in this Example.

EXAMPLE 4

Produce the metal protective coating with the method described in Example 1, with the following difference: water soluble fluorocarbon film formation resin (water soluble fluorocarbon emulsion SKFT-I, purchased from Beijing Sokang Nano Technology Co., Ltd.) is used as the water soluble film formation resin.

EXAMPLE 5

Produce the metal protective coating with the method described in Example 1, with the following difference: water soluble styrene-acrylic film formation resin (styrene-acrylic emulsion xy-108b, purchased from Guangzhou Chaolong Chemical Technology Co., Ltd.) is used as the water soluble film formation resin.

EXAMPLE 6

Produce the metal protective coating with the method described in Example 1, with the following difference: the second silane derivative is not added.

COMPARATIVE EXAMPLE 1

Produce the metal protective coating with the method described in Example 1, with the following difference: the promoter is not added.

COMPARATIVE EXAMPLE 2

Produce the metal protective coating with the method described in Example 1, with the following difference: the first silane derivative is not added.

PREPARATION EXAMPLE 1

Take the metal protective coating obtained in Examples 1-6 and the metal protective coating obtained in comparative Examples 1-2, and apply them on Zn plating steel sheets (model DX54D, purchased from Pangang Group Panzhihua Vanadium & Titanium Co., Ltd., with 95 wt. % Zn in the Zn plating) respectively, dry for 2 s by hot air drying at 90-110°

C., to obtain treated Zn plating steel sheets 1-8. Wherein, the dosage of the metal protective coating is determined appropriately so that the thickness of the coating layer of the Zn plating steel sheets 1-8 is 0.8 μm. The thickness of the coating layer is the value measured with an XRF unit (X-RAY fluorescent spectrometer).

PREPARATION EXAMPLE 2

Take the metal protective coating materials obtained in Examples 1-6 and the metal protective coating materials obtained in comparative Examples 1-2, and apply them on Al—Zn plating steel sheets (model DX51D+AZ, purchased from Pangang Group Panzhihua Vanadium & Titanium Co., Ltd., with 42.5 wt. % Zn and 52.3 wt. % Al in the Al—Zn plating) respectively, dry for 2 s by hot air drying at 90-110° C., to obtain treated Al—Zn plating steel sheets 1-8. Wherein, the dosage of the metal protective coating is determined appropriately so that the thickness of the coating layer of the Al—Zn plating steel sheets 1-8 is 0.8 μm. The thickness of the coating layer is the value measured with an XRF unit (X-RAY fluorescent spectrometer).

TESTING EXAMPLE 1

Carry out neutral salt spray test as per GB/T10125-1997, and measure the corrosion-resistance performance of Zn plating steel sheets 1-8 and Al—Zn plating steel sheets 1-8. The sheets are evaluated as acceptable according to the criterion "percentage of corroded area <20% after 96 h salt spray test".

Measure the water resistance performance of Zn plating steel sheets 1-8 and Al—Zn plating steel sheets 1-8 with the following method.

Add approx. 2 ml boiling water in droplets onto the surfaces of horizontally laid Zn plating steel sheets 1-8 and Al—Zn plating steel sheets 1-8, let the sheets to dry for 24 naturally, attach a 3M adhesive tape to the part where the water droplets are dropped, peel off the adhesive tape and count the stain spots, and judge the water resistance performance of the film according to the number of stain spots per square centimeters on the adhesive tape. The more the stain spots are, the poorer the water resistance performance is.

Measure the thermal resistance performance of Zn plating steel sheets 1-8 and Al—Zn plating steel sheets 1-8 with the following method.

Load Zn plating steel sheets 1-8 and Al—Zn plating steel sheets 1-8 into a hot-blast furnace, bake for 20 min., at 300° C., and then take them out and check whether there is any morphological change on the coating surface, measure the $\Delta L$ (luminance variable), $\Delta a$ (red and green variable), and $\Delta b$ (yellow and blue variable) of sample surface before and after baking with a colorimeter, and calculate $\Delta E$ (chromatic aberration)$=(\Delta L^2+\Delta a^2+\Delta b^2)^{1/2}$. The smaller the $\Delta E$ is, the higher the thermal resistance performance of the coating is.

Measure the fingerprint resistance performance of Zn plating steel sheets 1-8 and Al—Zn plating coated steel sheets 1-8 with the following method.

Measure the $\Delta L$ (luminance variable), $\Delta a$ (red and green variable), and $\Delta b$ (yellow and blue variable) of Zn plating steel sheets 1-8 and Al—Zn plating steel sheets 1-8 before and after 0.5 g/m² Vaseline is applied with a colorimeter, and calculate the $\Delta E$ (chromatic aberration)$=(\Delta L^2+\Delta a^2+\Delta b^2)^{1/2}$; the smaller the $\Delta E$ is, the higher the fingerprint resistance performance is.

The testing results are shown in Table 1.

TABLE 1

| Sample | Percent of Pass in Salt Spray Test (%) | Water Resistance (Stain Spots) | Thermal Resistance ($\Delta E$) | Fingerprint Resistance ($\Delta E$) |
|---|---|---|---|---|
| Zn plating steel sheet 1 | 100 | 3 | 0.95 | 1.05 |
| Zn plating steel sheet 2 | 99 | 5 | 1.07 | 1.15 |
| Zn plating steel sheet 3 | 98 | 6 | 1.06 | 1.14 |
| Zn plating steel sheet 4 | 99 | 4 | 1.13 | 1.18 |
| Zn plating steel sheet 5 | 98 | 5 | 1.11 | 1.22 |
| Zn plating steel sheet 6 | 95 | 9 | 1.32 | 1.39 |
| Zn plating steel sheet 7 | 85 | 30 | 2.31 | 1.97 |
| Zn plating steel sheet 8 | 83 | 25 | 2.15 | 2.04 |
| Al—Zn plating steel sheet 1 | 100 | 5 | 0.97 | 1.22 |
| Al—Zn plating steel sheet 2 | 98 | 4 | 0.86 | 1.20 |
| Al—Zn plating steel sheet 3 | 99 | 6 | 1.07 | 1.21 |
| Al—Zn plating steel sheet 4 | 99 | 4 | 1.12 | 1.17 |
| Al—Zn plating steel sheet 5 | 98 | 8 | 1.05 | 1.22 |
| Al—Zn plating steel sheet 6 | 96 | 12 | 1.23 | 1.43 |
| Al—Zn plating steel sheet 7 | 82 | 40 | 1.99 | 2.18 |
| Al—Zn plating steel sheet 8 | 81 | 36 | 1.86 | 1.95 |

It can be seen from the data in Table 1 that, the protective film formed by the metal protective coating provided in the present invention has outstanding corrosion resistance, water resistance, thermal resistance, and fingerprint resistance properties.

In addition, in the case that the silane coupling agent also contains the second silane derivative, the corrosion resistance, water resistance, thermal resistance, and fingerprint While some preferred embodiments of the present inven- resistance properties of the protective film formed by the metal protective coating can be further improved. tion are described above, the present invention is not limited to the details in those embodiments. Those skilled in the art can make modifications and variations to the technical scheme of the present invention, without departing from the spirit of the present invention. However, all these modifications and variations shall be deemed as falling into the protected domain of the present invention.

In addition, it should be noted: the specific technical features described in above embodiments can be combined in any appropriate form, provided that there is no conflict. To avoid unnecessary repetition, the possible combinations are not described specifically in the present invention.

Moreover, the different embodiments of the present invention can be combined freely as required, as long as the combinations don't deviate from the ideal and spirit of the present invention. However, such combinations shall also be deemed as falling into the scope disclosed in the present invention.

The invention claimed is:

1. A metal protective coating, which is obtained by mixing homogeneously a raw mixture, which contains water soluble silicate, promoter, silane coupling agent, silicon oxide packing, water soluble film formation resin, and water; wherein, the promoter is at least one selected from the group consisting of methyl cellulose, carboxymethyl cellulose, carboxyethyl cellulose, carboxymethyl-hydroxyethyl cellulose, and their soluble salts; the silane coupling agent contains a first silane derivative shown in formula (1), wherein, $R_1$, $R_2$, and $R_3$ are methoxyl or ethyoxyl respectively, and n is an integer with the range of 1-4;

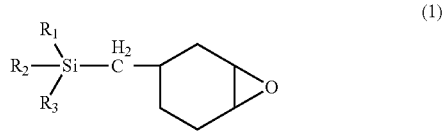

(1)

wherein, relative to 1 part by weight water soluble silicate, a dosage of the promoter is 0.5-0.7 part by weight, a dosage of the silane coupling agent is 1.4-1.8 parts by weight, a dosage of the silicon oxide packing is 0.6-0.85 part by weight, a dosage of the water soluble film formation resin calculated in solid substance is 2.1-2.7 parts by weight, and a dosage of water is 25-40 parts by weight.

2. The metal protective coating according to claim 1, wherein, the promoter is methyl cellulose.

3. The metal protective coating according to claim 1, wherein, all of $R_1$, $R_2$, and $R_3$ of formula 1 are methoxyl, and n is 2.

4. The metal protective coating according to claim 1, wherein, the silane coupling agent further comprises a second silane derivative, which is at least one selected from the group consisting of γ-aminopropyl-triethoxy silane, γ-glycidol ether propoxy-trimethoxy silane, γ-methacryl-oxy-propyl-trimethoxy silane, and N-2-aminoethyl-3-aminopropyl-trimethoxy silane.

5. The metal protective coating according to claim 4, wherein, the weight ratio of the first silane derivative to the second silane derivative is 1:0.1-0.4.

6. The metal protective coating according to claim 1, wherein, the silicon oxide packing is silicon dioxide nano-powder and/or silicasol.

7. The metal protective coating according to claim 1, wherein, the water soluble film formation resin is at least one selected from the group consisting of water soluble polyester film formation resin, water soluble styrene-acrylic film formation resin, water soluble epoxy film formation resin, water soluble polyurethane film formation resin, water soluble silicone-acrylic film formation resin, water soluble acrylic film formation resin, and water soluble fluorocarbon film formation resin.

8. A hot-dip Zn metallic material, which comprises a hot-dip Zn metallic substrate and a coating layer attached to the hot-dip Zn metallic substrate, wherein, the coating layer is the cured product of the metal protective coating according to claim 1.

9. The hot-dip Zn metallic material according to claim 8, wherein, the promoter is methyl cellulose.

10. The hot-dip Zn metallic material according to claim 8, wherein, all of $R_1$, $R_2$, and $R_3$ are methoxyl, and n is 2.

11. The hot-dip Zn metallic material according to claim 8, wherein, the thickness of the coating layer is 0.05-2 μm.

12. The hot-dip Zn metallic material according to claim 8, wherein, the method for attaching the coating layer to the hot-dip Zn metallic substrate comprises: applying the metal protective coating to the surface of the hot-dip Zn metallic substrate, and then drying at 60-120° C for 0.5-3 s.

13. A hot-dip Al—Zn metallic material, which comprises a hot-dip Al—Zn metallic substrate and a coating layer attached to the hot-dip Al—Zn metallic substrate, wherein, the coating layer is the cured product of the metal protective coating according to claim 1.

14. The hot-dip Al—Zn metallic material according to claim 13, wherein, the promoter is methyl cellulose.

15. The hot-dip Al—Zn metallic material according to claim 13, wherein, the thickness of the coating layer is 0.1-1 μm.

16. The hot-dip Al—Zn metallic material according to claim 13, wherein, the method for attaching the coating layer to the hot-dip Al—Zn metallic substrate comprises: applying the metal protective coating to the surface of the hot-dip Al—Zn metallic substrate, and then drying at 60-120° C. for 0.5-3 s.

* * * * *